United States Patent [19]

Rothwell et al.

[11] 4,386,292
[45] May 31, 1983

[54] PROJECTION LAMP COMPRISING SINGLE ENDED ARC DISCHARGE LAMP AND AN INTERFERENCE FILTER

[75] Inventors: Harold L. Rothwell, Rowley; William M. Keeffe, Rockport; George J. English, Reading, all of Mass.

[73] Assignee: GTE Products Corporation, Stamford, Conn.

[21] Appl. No.: 165,307

[22] Filed: Jul. 2, 1980

[51] Int. Cl.³ .......................... H01J 5/16; H01J 61/40
[52] U.S. Cl. .................................... 313/112; 313/639; 313/792; 313/564; 313/113; 362/293
[58] Field of Search ................ 313/112, 228, 113, 229

[56] References Cited

U.S. PATENT DOCUMENTS

| | | | |
|---|---|---|---|
| 3,528,725 | 9/1970 | Barkley | 350/166 |
| 3,704,928 | 12/1972 | Coombs et al. | 350/1.6 |
| 3,974,410 | 8/1976 | Collins et al. | 313/229 X |
| 4,095,881 | 6/1978 | Maddox | 350/1.1 X |
| 4,302,699 | 11/1981 | Keeffe et al. | 313/229 |

*Primary Examiner*—Alfred E. Smith
*Attorney, Agent, or Firm*—James Theodosopoulos

[57] ABSTRACT

A projection lamp comprises a single-ended metal halide arc discharge lamp disposed within a curved reflector and an interference filter disposed in front of the reflector, the filter being highly transmissive of visible light and reflective of radiation for which the metal halide, in molten salt form, is highly absorptive.

4 Claims, 1 Drawing Figure

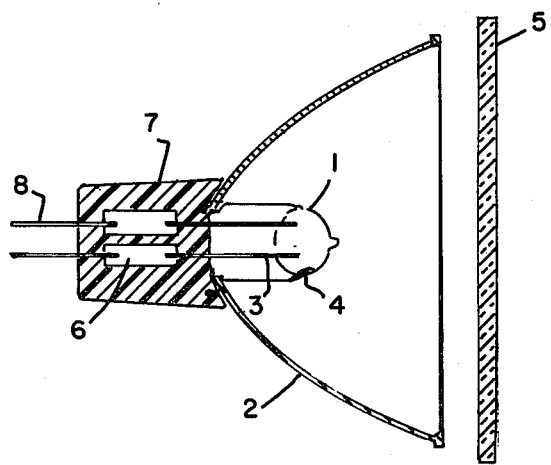

PROJECTION LAMP COMPRISING SINGLE ENDED ARC DISCHARGE LAMP AND AN INTERFERENCE FILTER

TECHNICAL FIELD

This invention relates to projection lamps, that is to say, lamps having a light source mounted within a curved reflector to direct the visible radiation in a desired direction.

BACKGROUND ART

Light sources for projection lamps have generally comprised incandescent lamps, the source of light being a coiled tungsten filament heated to incandescence by electric current flow therethrough. It is known to use interference filters in such lamps. U.S. Pat. Nos. 3,662,208 and 4,017,758 disclose the use of infrared-reflecting interference filters in front of reflector lamps to prevent undue heating of objects illuminated by the lamps. U.S. Pat. Nos. 4,095,881 and 3,209,188 disclose the use of such filters with tungsten-halogen lamps to reflect heat back to the lamp in order to aid in maintaining the lamp wall above the temperature necessary for the halogen cycle. U.S. Pat. Nos. 3,704,928 and 3,528,725 disclose the use of interference filters to correct the color of emitted light. The prior art does not disclose the use of interference filters with projection lamps to improve lamp efficacy (lumens per watt). Although it is known that the efficacy of an incandescent lamp can be improved by means of a suitable interference filter on the lamp envelope (see U.S. Pat. No. 4,160,929 and Offenlegungsschrift No. 24 48 348, which corresponds to U.S. application Ser. No. 410,914, filed Oct. 23, 1973), it is difficult to actually improve efficacy, unless the filament is relatively large, because of the problem of accurately positioning the filament at the axis of the envelope.

In reflector lamps having interference filters in which the light source is an arc discharge lamp, the interference filter generally reflects visible light and transmits infrared radiation in order to prevent undue heating of the illuminated object, as shown in U.S. Pat. Nos. 3,174,067 and 3,379,868, or in order to avoid high temperatures on external lamp surfaces, as in U.S. Pat. No. 4,197,480.

DISCLOSURE OF INVENTION

This invention discloses a projection lamp in which an interference filter actually improves lamp efficacy. The lamp comprises a single-ended electroded metal halide arc discharge tube mounted within a curved reflector. During normal operation, some of the metal halide exists in a so-called condensate state; that is to say, only a fraction of the total metal halide within the arc tube is vaporized. The interference filter is located in front of the lamp and selectively reflects radiation that will be absorbed by the condensate, which results in increased evaporation of the condensate and, therefore, increased efficacy. Of course, the interference filter efficiently transmits the desired visible radiation.

In incandescent lamps most of the undesired radiation is infrared radiation. In metal halide arc discharge lamps, in contrast, much of the undesired radiation is in the ultraviolet region of the spectrum, as shown in "Energy balance of the scandium-sodium iodide arc lamp", IES, July 1975, pp. 261–264. Therefore, the interference filter can be designed to reflect ultraviolet and/or infrared radiation. In any case, the preferred reflected radiation is that for which the condensate in the arc tube has a high absorptivity.

BRIEF DESCRIPTION OF DRAWING

The single FIGURE in the drawing is a schematic sectional view of a projection lamp in accordance with this invention.

DESCRIPTION OF PREFERRED EMBODIMENT

As shown in the drawing, a projection lamp in accordance with this invention comprises a single-ended metal halide arc discharge tube 1 mounted in a curved reflector 2. Arc tube 1 has two electrodes 3 and a fill including a starting gas and a metal halide. During normal lamp operation, some of the metal halide exists as a molten salt in arc tube 1. This is indicated as condensate 4 and generally occurs at the cold spot of the arc tube. An interference filter 5 is disposed in front of reflector 2. Filter 5 is highly transmissive of visible radiation and highly reflective of radiation for which condensate 4 has high absorption.

One example of a projection lamp in accordance with this invention was a 40 watt lamp in which arc tube 1 had been fabricated from T3 fused quartz tubing (about 9.4 mm O.D. by 7.4 mm I.D.), had an arc tube volume of about ¼ cc, and contained a fill of starting gas, mercury, sodium iodide and scandium iodide. The arc length (distance between tips of electrodes 3) was 3.1 mm. Electrodes 3 were connected to molybdenum ribbons 6 which were embedded in press seal 7 of arc tube 1. Ribbons 6 were connected to external lead-in wires 8. Arc tube 1 was disposed at about the focus of parabolic reflector 2 which was made of glass and had a reflective aluminum coating thereon. Reflector 2 was about 1⅛ inches long and had a maximum diameter of about 2¼ inches. Interference filter 5 was made of glass and had a dichroic coating thereon such that the transmittance of visible radiation through filter 5 was about 90% while the reflectance of ultraviolet and infrared radiation was high.

When lamp 1 was operated at its rated wattage, without interference filter 5 in front of reflector 2, the light output was 1618 lumens and the color temperature of the light was 4941° K. When interference filter 5 was proximately placed in front of reflector 2, the light output increased to 1816 lumens and the color temperature dropped to 4688° K. The lumen increase of 198 lumens represents a 12.2% increase in luminous efficacy. Spectral power distribution curves show that the sodium and scandium emission was increased by the presence of interference filter 5 while the mercury emission was left almost unchanged. For example, the scandium emission at 508 and 510 nanometers increased from 33.4 and 58.1 milliwatts/nm, respectively, to 40.4 and 68.8 mW/nm. The sodium emission at 588 and 590 nm increased from 66.2 and 93.2 to 71.9 and 107.3 mW/nm. The scandium emission at 600 to 640 nm increased an average of about 26%. In contrast, the mercury emission at 436, 438 and 546 nm was 143.6, 140.8 and 215.4 mW/nm without the filter and was 143.4, 142.4 and 218.7 mW/nm with the filter, substantially the same. These results show that condensate 4, which comprised the iodides of sodium and scandium, absorbed radiation reflected by interference filter 5 and was increasingly volatilized.

We claim:

1. The combination of: (1) a projection lamp comprising a single-ended electroded arc discharge tube disposed within a curved reflector, the tube containing, during normal lamp operation, a condensate comprising a molten salt of a metal halide; and (2) an interference filter disposed in front of the reflector, the filter being highly transmissive of visible light and highly reflective of radiation for which the condensate has high absorption in order to increase lamp efficacy.

2. The combination of claim 1 wherein the radiation for which the condensate has high absorption is in the ultraviolet region of the spectrum.

3. The combination of claim 1 wherein said condensate comprises the iodides of sodium and scandium.

4. The combination of claim 1 wherein the curved reflector has a focus and the arc discharge tube is disposed at about said focus.

* * * * *